United States Patent
Paul et al.

(10) Patent No.: US 8,478,876 B2
(45) Date of Patent: Jul. 2, 2013

(54) SYSTEM AND METHOD FOR DYNAMIC MANAGEMENT AND DISTRIBUTION OF DATA IN A DATA NETWORK

(75) Inventors: Sanjoy Paul, Karnataka (IN); Jayraj Ugarkar, Gujarat (IN)

(73) Assignee: Infosys Technologies Limited (IN)

(*) Notice: Subject to any disclaimer, the term of this patent is extended or adjusted under 35 U.S.C. 154(b) by 685 days.

(21) Appl. No.: 12/567,953

(22) Filed: Sep. 28, 2009

(65) Prior Publication Data

US 2010/0082818 A1 Apr. 1, 2010

(30) Foreign Application Priority Data

Sep. 29, 2008 (IN) .......................... 2381/CHE/2008

(51) Int. Cl.
*G06F 15/173* (2006.01)
*G06F 15/16* (2006.01)

(52) U.S. Cl.
USPC ........... 709/226; 709/218; 709/219; 709/224; 709/225

(58) Field of Classification Search
USPC ....................................................... 709/226
See application file for complete search history.

(56) References Cited

U.S. PATENT DOCUMENTS

| | | | |
|---|---|---|---|
| 7,076,792 B2 * | 7/2006 | Zigmond et al. | 725/38 |
| 7,478,414 B1 * | 1/2009 | Glusker et al. | 725/9 |
| 7,996,521 B2 * | 8/2011 | Chamberlain et al. | 709/224 |
| 2007/0107016 A1 * | 5/2007 | Angel et al. | 725/61 |
| 2007/0107017 A1 * | 5/2007 | Angel et al. | 725/62 |
| 2007/0220565 A1 * | 9/2007 | Angel et al. | 725/87 |
| 2008/0201451 A1 * | 8/2008 | Yu et al. | 709/219 |
| 2008/0215979 A1 * | 9/2008 | Clifton et al. | 715/716 |
| 2009/0005066 A1 * | 1/2009 | Florkey et al. | 455/456.1 |
| 2009/0049016 A1 * | 2/2009 | Sakamoto | 707/3 |
| 2009/0132559 A1 * | 5/2009 | Chamberlain et al. | 707/100 |

* cited by examiner

*Primary Examiner* — Richard G Keehn
(74) *Attorney, Agent, or Firm* — Cantor Colburn LLP (57) ABSTRACT

A dynamic data management and distribution system to interact with network computing devices of a user is provided. The user has memory allocated in the system. The system includes an ingest module for automatically uploading content from every network computing device and storing the content in the memory allocated to the user. Further, the system includes a sourcing module to retrieve information from user subscribed external information management services and storing the information in the allocated memory. The system includes a share module to share data with one or more users from a contact list of the user. Data includes part or whole of the information and content. The system also includes a self adaptive module, for proactively transferring data to one or more users from the contact list of the user based on the past behavior of the user.

30 Claims, 9 Drawing Sheets

SYSTEM AND METHOD FOR DYNAMIC MANAGEMENT AND DISTRIBUTION OF DATA IN A DATA NETWORK

BACKGROUND OF THE INVENTION

The present invention is directed to techniques for organizing personal data of one or more users in a virtual storage space and more particularly for accessing the data from multiple network devices. Further the invention is directed towards sharing the personal data of a particular user with other users of the virtual storage space by transferring the data to one or more of a plurality of network devices belonging to the other users.

The advent of digital media like digital photographs, images, sounds and video made it easier to save most of our personal moments on digital storage devices like the memory space of Personal Digital Assistants (PDAs), laptops, PCs, mobile phones, Digital Video Recorders (DVR), MP3 players, camcorders, digital cameras, cable or Internet Protocol television (IPTV) and the like.

With the rise of such devices, it became imperative that people shared their personal moments with their family and friends. The need of sharing gave rise to client based applications, protocols, and standards such as Bluetooth® and infrared transmitters. These applications, protocols, and standards allowed users to transfer data from one network device to another that was in its vicinity. The type of devices that could be used was restricted to only those devices that had these applications installed on them. Also, the distance to which the data could be transferred was a limitation.

For example, if a user wants to send an image captured from his mobile phone to one of his/her friend's television set or DVR, the present technology falls short. Also to transmit data from the mobile device to the digital camera would require the user to connect his mobile to a PC or a laptop via wired interface or USB, download the data to the PC or laptop, and then connect the digital camera to the laptop via wired interface or USB cable to transfer the data to the digital camera. This process is very cumbersome and long. There exists no way of sending the data directly from a variety of network devices to a different set of network devices via the available network interfaces. In the given instances there exists no way of directly sending data from a mobile phone to a digital camera.

Though current innovations allow users to share photographs captured and uploaded from their mobile phones, it does not span the other types of network devices like television, Digital Video Recorders, laptops, digital cameras, camcorders and the like, secondly it is restricted to images only, does not cover the other types of data like audio, video, text files and the like.

In addition, to automatically transfer data to a network device or to share the data with the other users without user interaction has not been captured by the current technology.

Accordingly, there is a need for an improved system and methods for transmitting and sharing data such as media data including video, images, and audio files automatically among all types of network computing devices.

SUMMARY OF THE INVENTION

According to one embodiment of the present invention, a dynamic system for managing and distributing data among a plurality of network computing devices of at least one user is disclosed. The system for managing and distributing data has memory allocated for each user. The system includes an ingest module for automatically uploading a plurality of content from each of the plurality of network computing devices and storing the plurality of content in the memory allocated for the respective user. The system further includes a sourcing module, which retrieves a plurality of information from one or more external information management services and stores the plurality of information in the memory allocated for the at least one user. The user is registered to use the one or more external information management services. The system further includes a share module to share the content and information, hereinafter referred to as data, with the other users present on a contact list of the at least one user. The system further includes a self adaptive module which learns from the at least one user's past behavior to proactively transfer data to any of the users on the contact list of the at least one user.

According to another embodiment of the present invention, a method for managing and distributing data obtained from a plurality of network computing devices is disclosed. The method includes automatically or manually retrieving a plurality of content from a plurality of network computing devices of at least one user and a plurality of information from external information management services. The method further includes cataloguing the data based on a predefined hierarchy. The method further includes obtaining network address of recipient set of network computing devices and automatically transferring the data to the recipient set of network computing devices.

DRAWINGS

These and other features, aspects, and advantages of the present invention will be better understood when the following detailed description is read with reference to the accompanying drawings in which like characters represent like parts throughout the drawings, wherein.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

The present invention relates to a system and method for dynamic managing and distribution of data in a data network. The system hereinafter referred to as Personal Virtual Library (PVL) has a unique network address and can be accessed from any network computing device of a registered user, from any network. Examples of network computing devices include, but are not limited to, mobile phones, cameras, PDAs, DVR, camcorder, MP3 players, IPTV etc. The network computing devices can upload and download a plurality of content to and from the PVL respectively. Examples of plurality of content include, but are no limited to, photographs, videos, music files, document, electronic messages, contact lists etc. The plurality of content is uploaded from a plurality of network computing devices of at least one user to the PVL. Further, other users in the data network can access this plurality of content and download it on their devices. Consequently, the plurality of network computing devices can also share the plurality of content amongst each other. The plurality of content uploaded from the plurality of network computing devices belonging to a single user gets stored in the individual memory allocated in the PVL for that user. According to one embodiment of the present invention, the plurality of content is uploaded automatically, wherein the content gets uploaded as soon as it is captured by the network computing device. In this way a user is able to access his personal data from anywhere and from any device.

Figure 1:
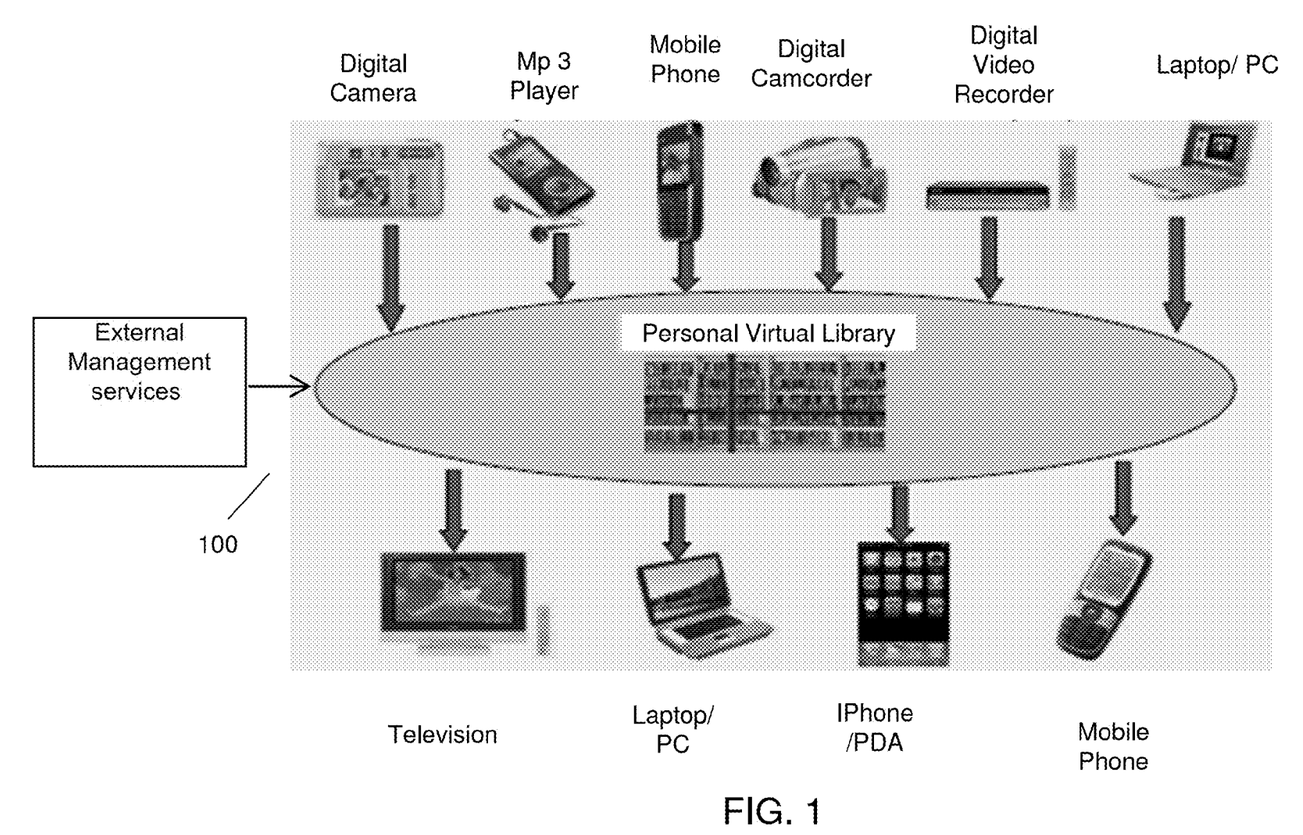
FIG. 1 illustrates a data network with a plurality of network computing devices, in which the present invention can be practiced.

Referring now to figures, FIG. 1 refers to a general block diagram of the system referred to as a Personal Virtual Library 100 aiding in seamless access of data from any network computing device present in any part of the world. FIG. 1 illustrates a plurality of network computing devices of at least one user interacting with each other through the PVL 100. Content from the plurality of network computing devices is uploaded to a memory allocated to the at least one user in the PVL 100. The stored content is now available for access to other users of the PVL 100.

Figure 2:
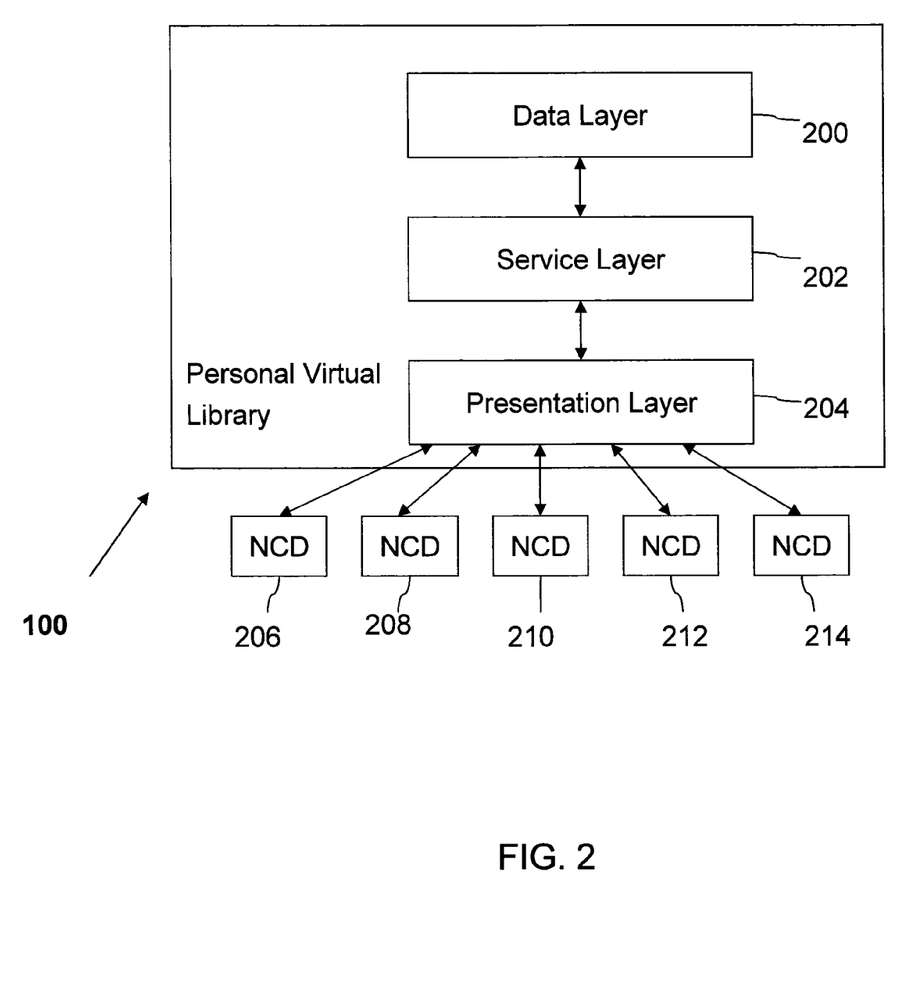
FIG. 2 illustrates a configuration of a dynamic data management and distribution system, in accordance with various embodiments of the present invention.

FIG. 2 illustrates a three layered architecture of the PVL 100 according to one embodiment of the present invention. The three layered architecture includes a data layer 200, a service layer 202, and a presentation layer 204. The data layer 200, service layer 202, and the presentation layer 204 aid a plurality of network computing devices (NCDs) 206, 208, 210 and 212 in data management and distribution. Examples of NCDs 206, 208, 210 and 212 include, but are not limited to, personal computers, laptops, Personal Digital Assistants (PDAs), digital cameras, MP3 players, digital camcorders, Television, iPhone®, iPod®, Digital Video Recorders (DVR), or any other system capable of capturing, storing and processing data over various network interfaces present. Examples of network interfaces include, but are not limited to, Wi-Fi, 3G/4G, Bluetooth™, Internet, and Universal Serial Bus (USB). Further, examples of data captured or stored by the plurality of network computing devices are audio files, video files, photographs, contact lists, documents, e-mails etc.

The Data Layer 200 includes plurality of databases to store all the content uploaded from the plurality of network computing devices of the at least one user. Further, the data layer 200 includes databases to store the metadata of the data. The data layer will be explained in greater detail in conjunction with FIG. 3. The Service Layer 202 includes functional modules required to support the dynamic data management and distribution system. The presentation layer 204 interacts with the plurality of NCDs 206, 208, 210 and 212 to obtain or distribute data. The presentation layer 204 manages all the NCD and data transfer network interface specific customization required for displaying the plurality of content on the plurality of NCDs.

Figure 3:
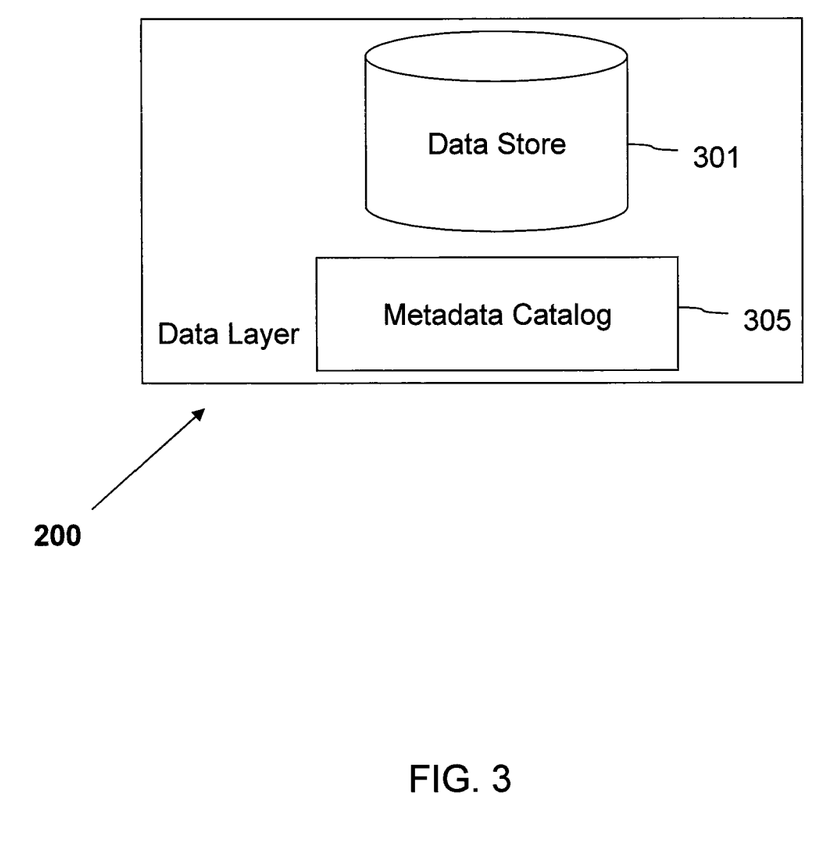
FIG. 3 illustrates a configuration of a data layer of the dynamic data management and distribution system, in accordance with another embodiment of the present invention.

FIG. 3 illustrates configuration of the Data Layer 200 of the PVL 100 in accordance with an embodiment of the invention. The Data Layer 200 contains a Data store 301 for storing plurality of content uploaded from the plurality of NCDs 206, 208, 210, and 212 of at least one user. Further, plurality of information uploaded from external information management services like Flickr™, Nokia Lifeblog, Google Picasa etc. is also uploaded on the data store 301. The plurality of content and plurality of information is referred to as data. Furthermore, the data layer 200 includes a metadata catalog 305 to store metadata of the data. Metadata, according to one embodiment, includes data-type, device-type, timestamp or any other user created tags.

According to one embodiment of the present invention, the plurality of NCDs is used to capture plurality of content. For example a digital camera is used to capture photographs of an event in the at least one user's life. The plurality of content is then uploaded on to the PVL 100. The data layer 200 of the PVL 100 stores the plurality of content in the data store 301 and metadata related to each of the plurality of content in the metadata catalog 305. The metadata, in this example, can be the type of device used to capture each of the plurality of content, type of each of the plurality of content, and timestamp associated with each of the plurality of content.

Figure 4:
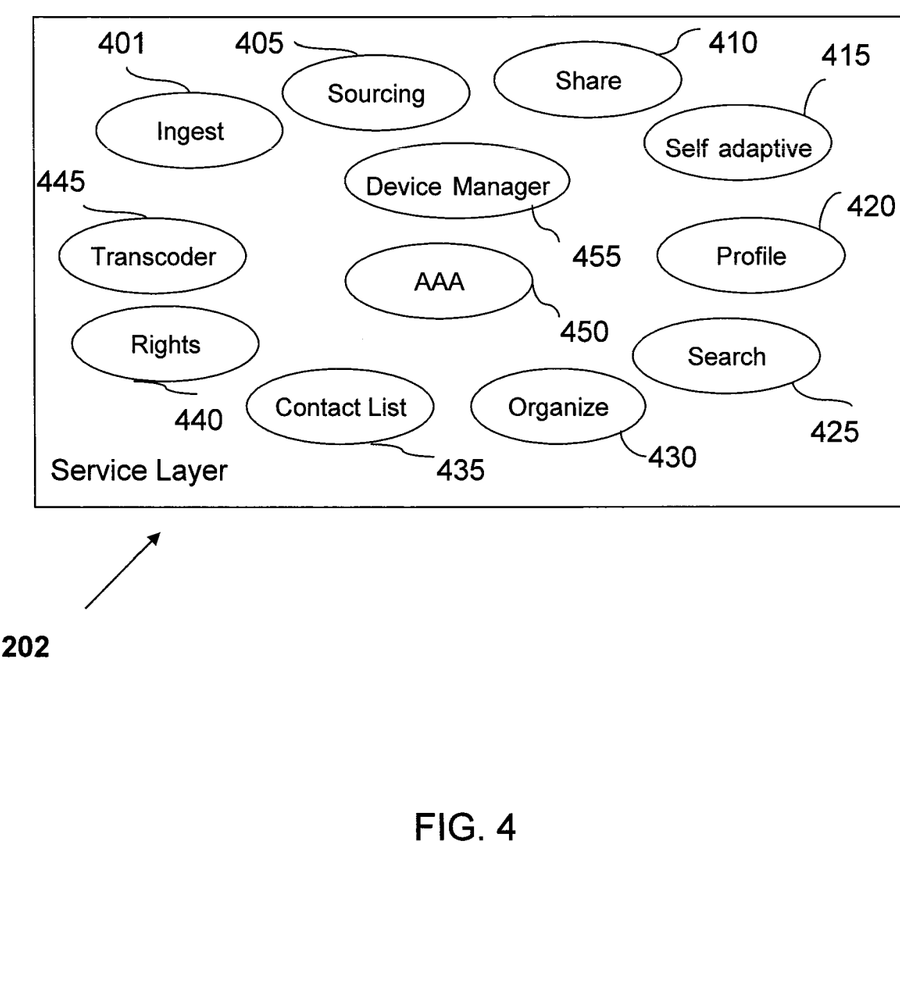
FIG. 4 illustrates a schematic block diagram of a service layer of the dynamic data management and distribution system, in accordance with yet another embodiment of the present invention.

FIG. 4 illustrates a schematic block diagram of the Service Layer 202, in accordance with the various embodiments of the present invention. The Service Layer 202 includes an Ingest Module 401 which supports the automatic upload of plurality of content from the plurality of NCDs 206, 208, 210, and 212. The ingest module 401 handles the functionality of uploading the plurality of content from each of the plurality of NCDs, and storing the plurality of content in a memory allocated for individual users in the PVL 100.

When the plurality of content is captured/uploaded from any of the plurality of NCDs, each of the plurality of content gets tagged automatically with the following metadata: [timestamp, device-type, and content/data-type]. The timestamp refers to the time each of the plurality of content is uploaded/modified from the respective NCD to the PVL 100. The timestamp is available from a digital clock present in each of the plurality of NCDs. The device-type would be known from a thin client of the present invention residing on each of the plurality of NCDs. Content/data-type refers to the type of content uploaded. Content/data-type can include but is not restricted to photos, music, videos, or text. According to one embodiment, content/data-type has a one-to-one correlation with the NCD; however in case of multi-modal device (for example, a mobile phone that can capture images, and record sound) the content-type would depend on which mode the device was used to create the content.

The NCD that is used to upload at least one of the plurality of content into the PVL 100 may choose from a plurality of available network interfaces. The user can set and change rules for uploading content. According to one embodiment, the rules for upload define which network interface should be preferred under what network conditions and at what time. For instance, the default rule for upload could be to use the network interface having the best available bandwidth. The user can also choose to manually upload the plurality of content by choosing for every set of content which network interface should be used.

The Service Layer 202 further includes a sourcing module 405 which retrieves a plurality of information from external information management services and stores the plurality of information in the memory allocated in the PVL 100 for the at least one user. Examples of external information management services include, but are not limited to, Picasa, Flickr™, Nokia Lifeblog and other information sharing services. According to one embodiment of the present invention, the sourcing module 405 sources the plurality of information automatically from the external information management services. For example, if the at least one user is already subscribed to one of the external management services like Flickr™, he/she provides the data management and distribution system with the username and password to access the plurality of information on the respective external management service. The sourcing module 405 then uses this username and password to access the external management service and obtain the plurality of information uploaded on the external management service from the plurality of NCDs of the same user. The sourcing module 405 does a periodic check of the external management services for updates in the plurality of information, and automatically retrieves all the current information from the external management services into the PVL 100 and stores it in Data Store 200 present in the Data Layer 200 of the PVL 100. The plurality of information from plurality of external information management services and plurality of content uploaded automatically by the ingest module 401 are collated and stored in the memory allocated to the at least one user in the PVL 100. The collated form of plurality of information and plurality of content is referred to as data. The user can access the PVL 100 over a web interface and re-organize or re-tag the data to suit his/her needs.

Control information such as a contact list, address book, or presence information or any other information that control the distribution and management of data among the plurality of NCDs in the data network is maintained by every user who has subscribed to an external management service. According to one embodiment of the present invention, the sourcing module 405 of the service layer 202 automatically retrieves all the control information from subscribed external information management services of the at least one user and makes the control information available in the Metadata Catalog 305 present in the Data layer 200 of the PVL 100. The presence information retrieved by the sourcing module 405 from the external information management service would enable the at least one user to find out the presence of his/her contact from the contact list.

Further, the service layer 202 also includes a share module 410 adapted to share data with one or more users from the contact list of the at least one user. The share module 410 uses the presence information to proactively push data to the network computing device on which the one or more users from the contact list of the at least one user are logged on to the data network. The share module 410 also transfers data from the memory allocated to the at least one user in the PVL 100 to network-attached photo frames, which can in turn be populated with data from the PVL 100 in a specification as set by the user. Similarly there could be other types of devices such as network-attached music players or network-attached TVs where the at least one user can push and display selective data. The share module 410 also handles data access by any Cable Television or Internet Protocol Television (IPTV) present in any part of the world. In order to make this happen, the PVL 100 maintains control information of each of the user's contacts as follows:

[Mobile$_i$, Wireless-Provider$_i$, Zip$_i$, Cable/IPTV-Provider$_i$, RG$_i$] where
Mobile$_i$=mobile phone number;
Wireless-Provider$_i$=name of wireless service provider;
Zip$_i$=Zip code of Postal Address;
Cable/IPTV-Provider$_i$=Cable or IP TV service provider name;
RG$_i$=Residential Gateway Internet Protocol (IP) Address According to one embodiment of the present invention, it is a requirement of the PVL 100 that the at least one user must provide information regarding which service provider his/her area belongs to at the time of registration. The metadata catalog 305 of the data layer 200 would contain information about the IP TV server corresponding to every Zip code. For example, let us assume that Judith (source) wants her friend Ana to watch on her IP TV, a video that she has shot recently in New York. If Ana i.e. the destination is located at a zip code of 07751 which maps to Morganville, N.J., the service provider will have information about the server that distributes IP TV content in that area. If the source and destination belong to different service providers, then the mapping will be done in two steps. The first step would be to find out which service provider the destination belongs to. This information is provided by the users themselves at the registration phase as mentioned above. The second step would be to use a database corresponding to the destination service provider who might make the information available to the PVL 100 service provider. Software for mapping would be run on a PVL 100 server for finding out which IP TV server the PVL 100 has to send the data to for distribution to the Ana's television device.

This information would be used by the PVL 100 to find out to the address of the head end server of the Ana's television device. If Judith uploads a video from say New York onto the PVL 100 and intends to share the video with the Television device of a recipient in San Francisco, then the PVL 100 would map the Zip code of San Francisco with the Head end server. Cable/IP TV service provider's name and push the video, up converted, to the PVL 100 folder of the intended recipient residing at the Head-end. At this time one of the two things can be done.

The Service layer 202 further includes the self adaptive module, 415 which keeps a track of the at least one user's past actions and proactively uses this historical information to predict the future behavior of the at least one user. This is referred to as auto learning. For example, if a user constantly shares data with some recipients of the network, the self adaptive module 415 will store this information and henceforth would automatically transfer the data to such recipients from one of the plurality of NCDs of the at least one user, without having the user to prompt the PVL 100 to do so. The data may not be displayed immediately but a notification would be sent to the most frequently accessed set of recipients for them to see the data instantly if they want to. An example of 'auto learning' is an 'automatic contact list'. The PVL 100 would have a trace of the commands executed by the at least one user and based on the analysis of the trace, if the PVL 100 detects that a user has been repeatedly sending certain type of data to the same set of recipient network addresses, it would create an 'automatic contact list' containing the address of the network computing devices of the frequently accessed set of recipients automatically for the user to use in future.

In yet another embodiment of the present invention, the self adaptive module 415 functionality pertains to the 'automatic distribution' of data. The self adaptive module 415 analyzes the trace of user commands and finds that the user has been sharing data with some recipients without fail. Referring to these recipients as popular recipients, next time whenever data would be uploaded from any of the user's network computing device or external information management services, the self adaptive module 415 would automatically detect where the popular recipients are available at that instant of time and push data to the network computing devices of the popular recipients. The data may not be displayed immediately but a notification that data is being shared by the at least one user with the popular recipient will be sent to the network computing device of the popular recipients so that the popular recipients can see the data instantly if they want to before allowing data to be downloaded to their device.

The Service Layer 202 further consists of an organize module 430 to create, update or delete sets or metadata of sets, assets or collection. In addition it also enables clustering, indexing and cataloging the data. A method of clustering, indexing and cataloguing the data uploaded into various sets will be explained along with the aid of FIG. 6.

Furthermore, the profile module, 420 of the service layer 202, manages and stores the personal details of the at least one user like user-id, passwords for the external information management services and the like and also configurations of the input and output NCDs. Further, the service layer 202 includes a search module, 425 that enables the user to perform a multi dimensional structured search over structured data. The N-dimensional input data usually comprises of 'N' sets of Keywords. For instance the N-dimensional input data can include Timestamp, Content/Data-Type, Device-Type and any other user defined Tags. When such an input data is used for search, a parallel search would be carried out across each of the 'N' keywords to yield 'N' sets of result. An intersection of all the result sets would give the final result 'R'.

The service layer also includes a contact list module, 435 that maintains the contact list of each user, which contains the network addresses of the network computing devices of other users on the network with whom the user wants to share data stored in the memory allocated for him on the PVL 100.

According to an embodiment of the present invention, the rights module 440 of the Service Layer 202 supports the rights of each user over the data uploaded on the PVL 100 by the at least one user of the data network. The users with whom data is shared by a user can request for rights to modify, copy, print or further share the data.

According to another embodiment of the present invention, the transcoder module, 445 transcodes the input data into formats that are compatible over the various network interfaces and NCDs of the data network. Once data is uploaded into the PVL 100, the data is automatically transformed into multiple formats and stored in the PVL 100 for transferring data to a multiplicity of NCDs in future. For 'n' types of NCDs there would be 'n' different transformations for data uploaded on the PVL 100. This process of automatic transcoding is referred to as auto sync-ing.

According to yet another embodiment of the present invention, the service layer 202 includes an Authentication Authorization and Audit (AAA) module, 450 which manages the security aspects of the system for dynamic data management and distribution. An Audit log file maintained by the AAA module 450 contains time, date and identity of each user who uploads or accesses data on the PVL 100.

According to yet another embodiment of the present invention, the device manager module 455 manages the vagaries in responses and request received from different network interfaces and NCDs of the data network.

Figure 5:
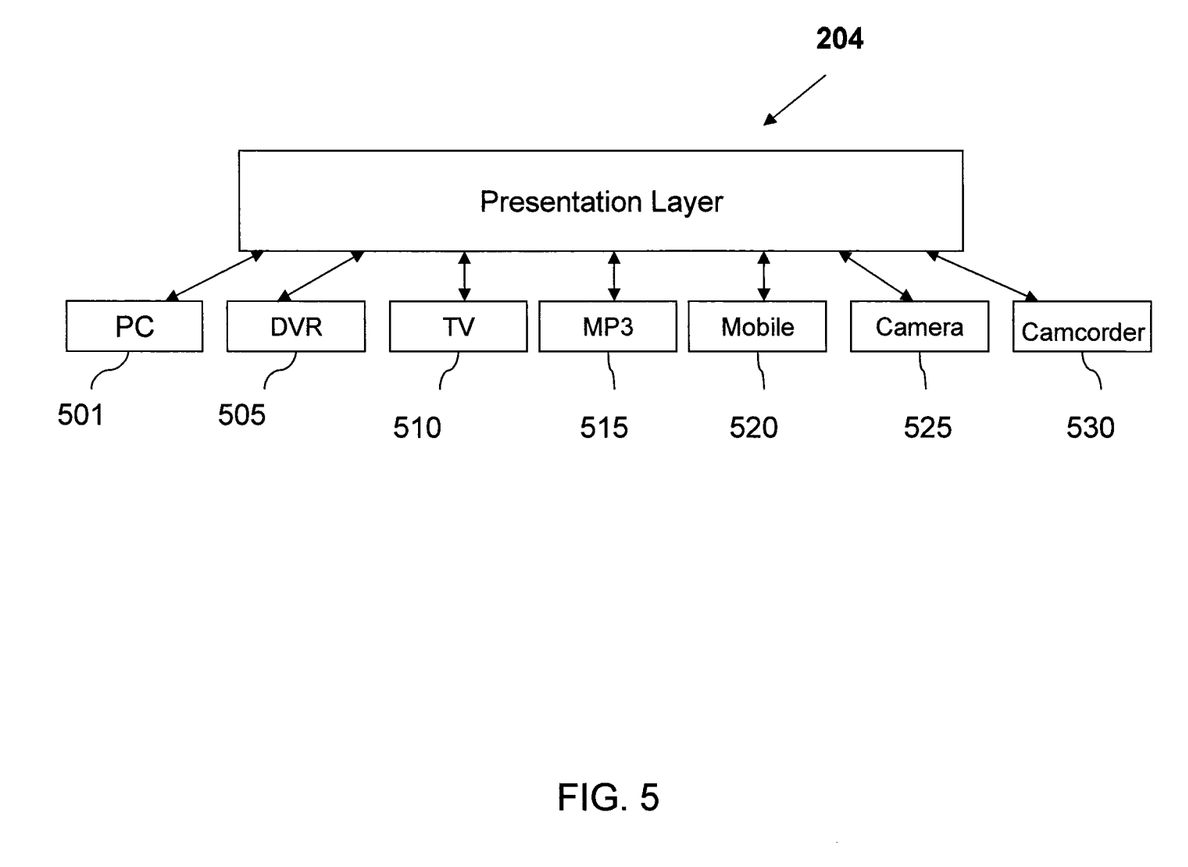
FIG. 5 illustrates a schematic block diagram of a presentation layer and the plurality network computing devices in interaction with the dynamic data management and distribution system, in accordance with yet another embodiment of the present invention.

FIG. 5 illustrates a block diagram of the Presentation Layer 204, in accordance with the various embodiments of the present invention. The Presentation Layer 204 manages the user interaction and presentation aspects across a plurality of NCDs over a plurality of network interfaces like the television, Computer, and mobile interface. The presentation layer manages all device and network interface specific customization required for displaying information on and supporting interaction with the plurality of network computing devices.

The presentation layer 204 provides the at least one user with a user interface that he/she would be able to access through his/her plurality of NCDs. For example, if the at least one user is using a laptop to upload data on to the PVL 100, the presentation layer 204 will allow the user to access data stored in the memory allocated to the at least one user in the PVL 100 with the help of a web page through the Internet. On the other hand, if the at least one user wants to use the PVL 100 from his/her television to upload/catalog/download data, the presentation layer 204 will let the at least one user to access the PVL 100 through a Program Guide present in his/her television through the Set Top Box.

Figure 6:
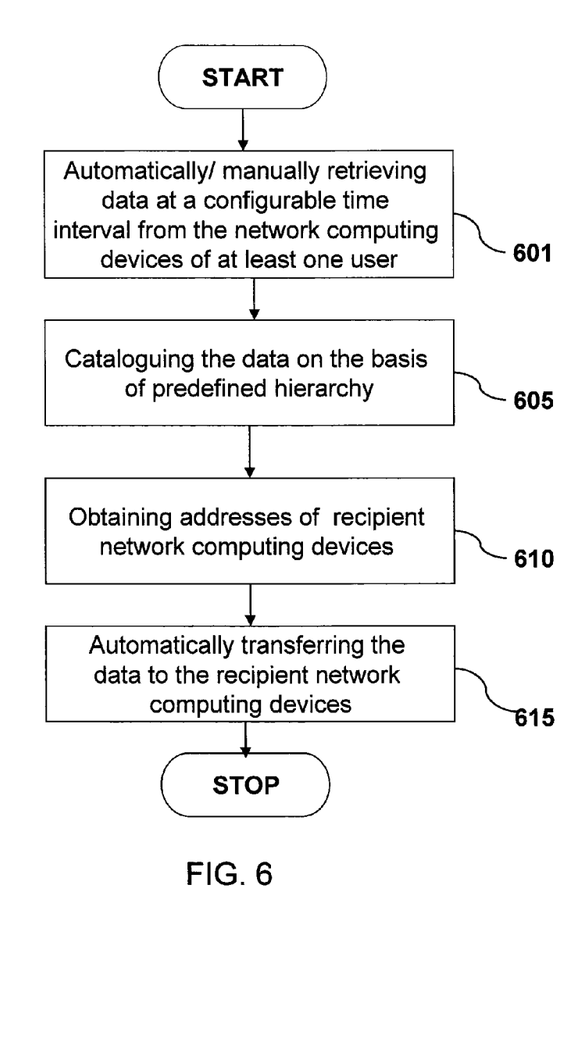
FIG. 6 is a flow chart illustrating a method of managing and distributing data in the dynamic data management and distribution system, in accordance with an embodiment of the present invention.

FIG. 6 is a flow chart illustrating a method of managing and distributing a plurality of data in the data network, in accordance with the various embodiments of the present invention. For purpose of simplification, the method as illustrated in FIG. 6 will be explained taking the help of elements in FIGS. 3, 4, and 5. At step 601 data is automatically retrieved from at least one user in the data network at a configurable time interval. The retrieved data includes a plurality of content from a plurality of NCDs, for example the set of NCDs 501, 505, 510, 515, 520, 525, and 530 of at least one user and the a plurality of information from the plurality of external information management services, for example Picasa, Flickr™, and Nokia Lifeblog, subscribed to by the at least one user. The plurality of content is retrieved by the ingest module 401 in the service layer of the PVL 100. Further, the plurality of information is retrieved by the sourcing module 405 of the service layer. The at least one user may choose to configure the time interval in such a way that whenever content is captured by the NCDs it gets uploaded automatically into the PVL 100 without user intervention. Similarly, at a given instant of time latest information available on the external management services gets uploaded from the external management services into the PVL 100. All the data of the at least one user retrieved so by the PVL 100 gets stored by the Ingest Module 401 and the Sourcing Module 405 in the memory allocated for the at least one user in the Data Store 301 of the Data Layer 200 in the PVL 100. According to one embodiment of the present invention the Sourcing Module 405 automatically retrieves control information such as contact list, address book or presence information or any other control information that aids in controlling the distribution and management of data and stores the control information in the Metadata Catalog 305 present in the Data Layer 200 of the PVL 100.

Further, at step 605 data uploaded into the allocated memory of the user in the PVL 100, gets catalogued automatically by the Organize Module 430 present in the Service Layer 200 of the PVL 100 on a predefined hierarchy. The predefined hierarchy is set by the user on the basis of the following metadata: [timestamp, device-type, and content/data-type]. Data when uploaded into the PVL 100 gets automatically tagged with the said metadata. Additionally, user-defined tags can be used as metadata to any set of data. The step of clustering data is explained in greater detail later in this document with the help of FIGS. 7 and 8. Once data is clustered into a number of clusters on the basis of timestamp, within each cluster, data within each cluster is further catalogued on the basis of other metadata like content/data-type or device-type. To catalog data within each cluster on the basis of content/data-type first and then device-type or vice versa can be defined by the at least one user as a rule to be applied for cataloguing. All the data uploaded would then be automatically catalogued on the basis of the rule as set by the at least one user. At step 610 the PVL 100 would obtain addresses of a recipient set of NCDs from the plurality of NCDs to which the at least one user wishes to transfer data to. The recipient set of NCDs could be one or more of the plurality of NCDs that belong to the at least one user or one of more of the plurality of NCDs belonging to other users of the data network. The Share Module 410 present in the Service Layer 200 of the PVL 100 handles the process of sharing data from the plurality of NCDs of the at least one user with the other users from the contact list of the at least one user. The Share Module 410 uses the presence information stored in the Metadata Catalog 305 present in the Data Layer 200 of the PVL 100 to automatically push data to the NCDs of one or more users from the contact list of the at least one user. The decision to automatically/proactively push data, at step 615, is taken by the self adaptive module 415 present in the Service Layer 202 of the PVL 100. The self-adaptive module 415 analyses the trace of the at least one user's commands and finds those recipient NCDs to which the at least one user has been frequently sharing data. Referring to these recipient NCDs as popular recipients the next time whenever data would be uploaded from any of the at least one user's NCDs or external information management services, the self adaptive module 415 would automatically detect where the popular recipients are and proactively push the data to the popular recipients.

Figure 7:
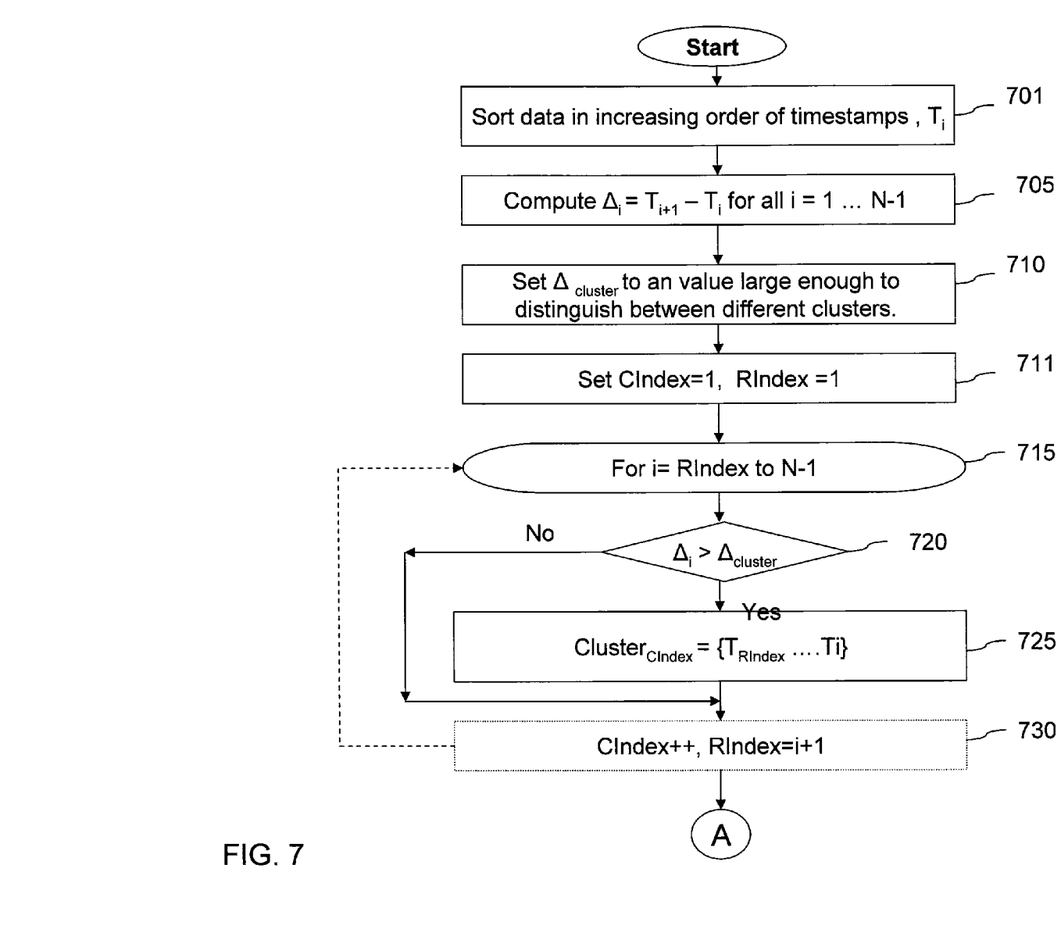
FIGS. 7 and 8 is a flow chart illustrating a method for clustering of data uploaded on the dynamic content management and distribution system and subsequent cataloguing of the data, in accordance with an embodiment of the present invention.
Figure 8:
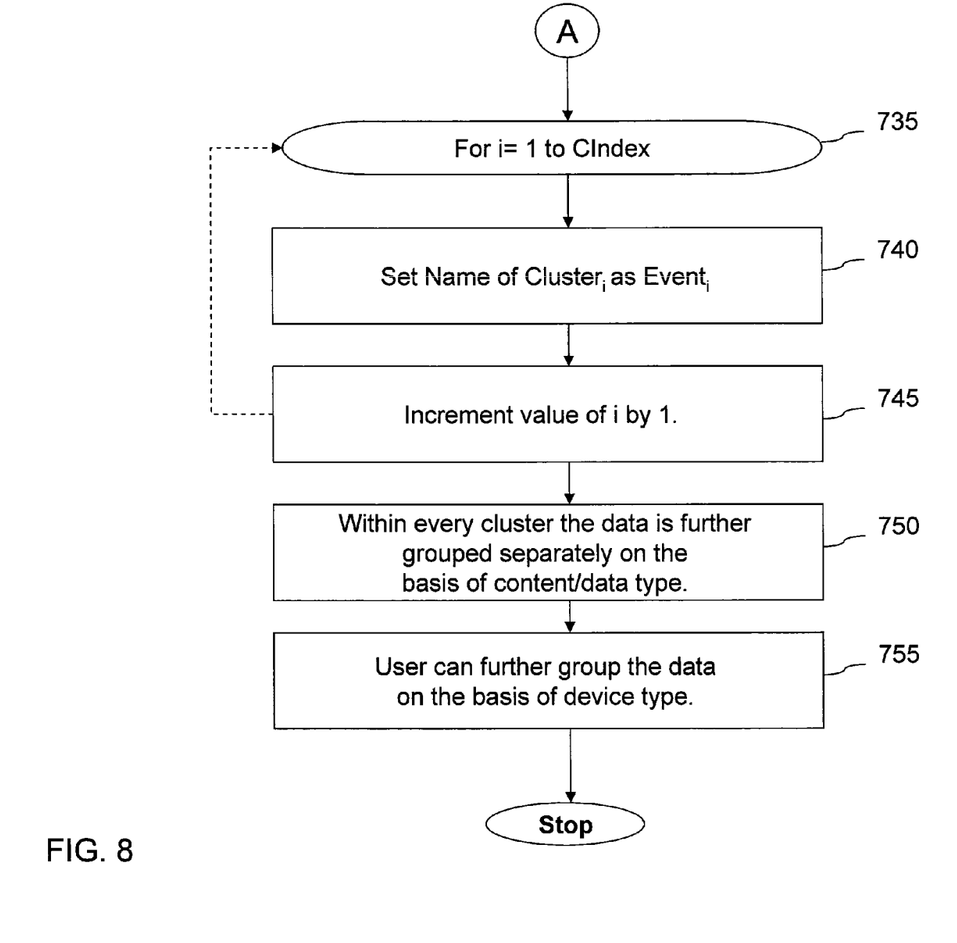

FIG. 7 and FIG. 8 is a flow chart illustrating a method of automatic clustering of data uploaded in the PVL 100, in accordance with an embodiment of the present invention. Once data is uploaded into the PVL 100, the PVL 100 would use the metadata to catalog the data. A timestamp is attached to data for any event. The PVL 100 follows the algorithm illustrated in FIG. 7 to automatically cluster the data on the basis of timestamps. At step 701, all the data uploaded from the plurality of NCDs and external information management services of a user are arranged in ascending order of timestamps. Timestamp refers to the time the data is captured from any of plurality of network computing devices or the external management services. At step 705, the difference between successive timestamps, $\Delta_i = T_{i+1} - T_i$ where 'i' ranges from 1 to 'N', is computed. At step 710, $\Delta_{cluster}$ is set to an appropriate value which corresponds to a time gap that is large enough to differentiate different events. All data pertaining to a particular event will be stored in one cluster. Data includes, but is not be limited to, photographs, videos, and music recordings.

Steps 715 to 730 deal with the formation of clusters, on the basis of timestamps that are relatively closer to each other than $\Delta_{cluster}$. The logic behind the relevant loop is, if the time difference between any two successive timestamps say $T_{i+1}$ and $T_i$ is greater than $\Delta_{cluster}$ then the two relevant timestamps would refer to different events and hence would be part of different clusters, thus the prior cluster would end at $T_i$. The next cluster would begin from $T_{RIndex}$, where RIndex is set to i+1 at step 730. The next cluster would be formed in a similar way as formed in steps 715 to 725. The clustering on the basis of timestamps takes place automatically by the system, without any user interaction.

Once the clustering is done, as per step 735 to 745 as shown in FIG. 8, each cluster which is categorized as $Cluster_{CIndex}$ is named as Event, where 'i' varies from 1 to total number of clusters formed. As step 750, within each cluster the data is further catalogued on the basis of content/data-type. In this way, for instance all photographs of a particular event would be catalogued separately than all music videos of the same event. The user would be able to access the data organization via a web-based interface of the PVL 100 and edit it. For instance, the user may change the name of a cluster from Event$_i$ to MySons5thBurthday and be able to provide additional meta-data in the form of tags to the data, for simplifying the search.

The data which is indexed by timestamp first, followed by content/data-type, followed by device type followed by tags may be indexed manually by the user by tags first, followed by content/data-type, followed by device type followed by timestamp or in any other way. The flexible indexing would help in expediting the search.

The users of the network can access the data uploaded on the PVL 100 by navigation or by multidimensional structured search. The data would be catalogued in various folders based on content/data-type, device type, timestamp and any other user defined tags. The user can access the data by navigating through the various folders through the web interface.

Figure 9:
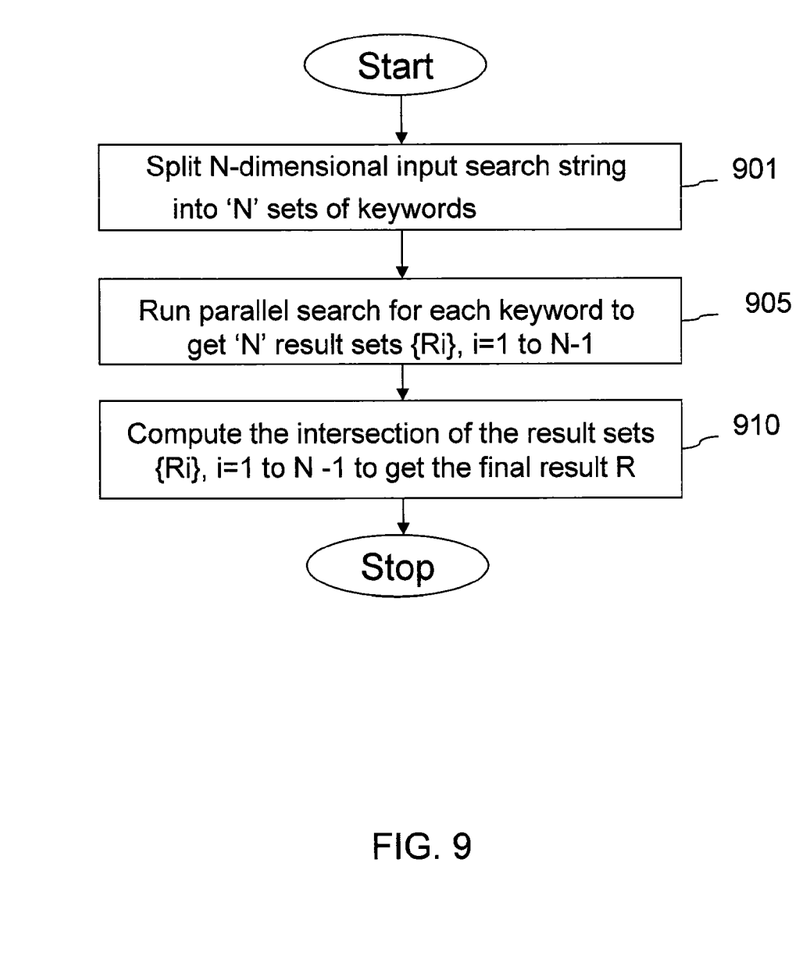
FIG. 9 is a flow chart illustrating a method for performing multi-dimensional structured search over data stored in the dynamic data management and distribution system, in accordance with an embodiment of the present invention.

An alternative method of searching data is by the multi-dimensional structured search as illustrated in FIG. 9 in accordance with an embodiment of the present invention. The input to the search would be an N-dimensional input data where each dimension would refer to a type of metadata. Metadata would include but is not restricted to timestamp, content/data-type, device type or any other user defined tag. Content/data-type includes, but is not restricted to, photos, videos, music, or text. Device-type would include but is not restricted to mobile, personal computers, laptops, Personal Digital Assistants (PDAs), digital cameras, MP3 players, digital camcorders, Television, iPhone, iPods, Digital Video Recorders (DVR), or any other system capable of capturing, storing and processing data. At step 901, the N-dimensional input search string would be divided into 'N' sets of keywords. At step 905, a search for every keyword is done parallelly to yield a result set for each keyword. Thus for 'N' keywords there would be 'N' result sets for the search. At step 910, an intersection of all the 'N' result sets is done to get the final result set, R. For instance if the N dimensional input data consists of [photos, mobile and 24 Jul. 2007] as the metadata, it means that the user wishes to search for all photographs that were uploaded from his mobile on the 24$^{th}$ of July.

At step 905, for example, a search for all photos as data is done along with a search for some of the plurality of content that is uploaded from the mobile device of the user and a search for all data that is uploaded on the 24 Jul. 2007 to yield 3 result sets. The first result set, $R_1$, corresponding to a search for all photos as data can include the set of photographs uploaded from all the NCDs of the at least one user. The second result, $R_2$ set corresponding to a search for some of the plurality of content uploaded from the mobile device of the user can include all types of content uploaded from the mobile device. The third result set, $R_3$ corresponding to a search for data uploaded on 24 Jul. 2007, can include all types of data uploaded by the user on 24 Jul. 2007. As per step 910, an intersection of the three result sets $R_1$, $R_2$ and $R_3$ will yield all photographs uploaded from the mobile device on 24 Jul., 2007 which is the final result set, R.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

While the following description is presented to enable a person of ordinary skill in the art to make and use the invention and is provided in the context of the requirement for a obtaining a patent the present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest cope consistent with the principles and features described herein.

Many modifications of the present invention will be apparent to those skilled in the arts to which the present invention applies. Further, it may be desirable to use some of the features of the present invention without the corresponding use of other features.

Accordingly, the foregoing description of the present invention should be considered as merely illustrative of the principles of the present invention and not in limitation thereof.

What is claimed is:

1. A system for dynamic management and distribution of data between a plurality of users in a data network, the system comprising:
 a personal virtual system configured to interact with a plurality of network computing devices of at least one user at a configurable time interval, the personal virtual system having a memory allocated for the at least one user, wherein the personal virtual system facilitates one or more other users to automatically access the personal virtual system for content sharing, the personal virtual system having processor and a memory, said memory comprising a plurality of modules comprising:
 an ingest module for automatically capturing, via the processor, content from each of the plurality of network computing devices of the at least one user and storing the captured content in the memory allocated for the at least one user;
 a sourcing module for automatically retrieving a plurality of information, via the processor, from external information management services and storing the plurality of information in the memory allocated for the at least one user, wherein the at least one user is a registered member of the external information management services;
 a share module adapted to automatically share data with the one or more other users, via the processor, from a contact list of the at least one user, wherein data comprises part or whole of the plurality of information retrieved from external information management services and the captured content from the plurality of network computing devices;
 an organize module adapted to automatically categorize the captured content into a plurality of clusters based on analysis of timestamps;
 wherein the timestamps refer to the time each item of captured content is captured;
 wherein the timestamps are used to determine if the content associated with the timestamps should be categorized into different clusters based on a gap of time between timestamps;
 wherein a cluster represents a specific event, and after the timestamp analysis, the cluster is further catalogued on the basis of any combination of device type, content type or data type; and
 a self adaptive module, for proactively transferring the data to the one or more other users from the contact list of the at least one user based on the past behavior of the at least one user.

2. The system according to claim 1, wherein the personal virtual system is configured to manage interaction with the at least one user and present the data on the plurality of network computing devices.

3. The system according to claim 1, wherein the personal virtual system comprises a metadata catalog and a data store, wherein the metadata catalog stores at least one of metadata of the data and metadata of all the users on the contact list of the at least one user and the data store stores the data.

4. The system according to claim 3, further comprising a search module to enable the user to perform a multi-dimensional structured search on at least one of the metadata.

5. The system according to claim 3 wherein the organize module provides a functionality to at least one of create the data, update the data, delete the data, update the metadata, delete the metadata and to permit flexible indexing of the data on the basis of the metadata of the data.

6. The system according to claim 3, further comprising a second metadata module adapted to edit the metadata.

7. The personal virtual system according to claim 1, further comprising a rights module to handle requests from the at least one user to modify rights for managing the data shared by the at least one user.

8. The personal virtual system according to claim 1, further comprising a profile module to store at least one user identification, password of the external information management services and configurations of the plurality of network computing devices.

9. The personal virtual system according to claim 1, further comprising a transcoder module to transform the data uploaded to suit requirements of the plurality of network computing devices of the at least one user, wherein requirements of the plurality of network computing devices comprise file type of the data, or size of the data.

10. The personal virtual system according to claim 1, further comprising an authorization authentication audit module adapted to authenticate and authorize access to the data uploaded onto the personal virtual system by the at least one user and to maintain an audit file.

11. The personal virtual system according to claim 1, further comprising a device manager module for managing at least one of the ways of presenting the data on one or more network interfaces connecting the plurality of network computing devices.

12. The system according to claim 11, wherein the plurality of network devices, choose the one or more network interfaces for uploading the plurality of content to the personal virtual system.

13. The system according to claim 12, wherein the at least one user chooses appropriate network interface from the one or more network interfaces to upload the plurality of content to the personal virtual system.

14. The system according to claim 13, wherein the network interface is Wi-Fi or third generation cellular network or fourth generation cellular network or Bluetooth or USB or the Internet.

15. The system according to claim 1, wherein the plurality of network computing devices for uploading the plurality of contents comprise at least one of a mobile phone device, a cellular phone device, a personal digital assistant, Digital Video Recorders, Personal Video Recorders, music players, iPods, a personal computer, a laptop, cable television and Internet Protocol (IP) television.

16. The system according to claim 1, wherein the plurality of network devices access the personal virtual system through at least one of a web interface and a Program Guide.

17. A method for dynamic management and distribution of data between a plurality of users in a data network, the method comprising:
   automatically capturing data from a plurality of network computing devices of at least one user and the external management services of the at least one user at a configurable time interval via a personal virtual system, the personal virtual system configured to interact with the plurality of network computing devices and having a memory allocated for the at least one user, wherein the personal virtual system facilitates one or more other users in the data network to automatically access the captured data related to the at least one user;
   indexing and cataloguing the captured data based on a predefined hierarchy;
   automatically categorizing the captured content into a plurality of clusters based on analysis of timestamps;
      wherein the timestamps refer to the time each item of the captured data is captured;
      wherein the timestamps are used to determine if the data associated with the timestamps should be categorized into different clusters based on a gap of time between timestamps;
      wherein a cluster represents a specific event, and after the timestamp analysis, the cluster is further catalogued on the basis of any combination of device type, content type or data type; and
   obtaining addresses of a recipient set of network computing devices pertaining to the one or more other users of the data network, wherein the addresses are obtained from a contact list of the at least one user; and
   automatically transferring the captured data to the recipient set of network computing devices of the other users of the data network.

18. The method according to claim 17, wherein the step of automatically capturing data further comprises choosing a network interface from a plurality of network interfaces based on a user defined condition.

19. The method according to claim 18, wherein the user defined condition comprises type of data to be retrieved, type of the network computing device, location of the network computing device, and bandwidth of the plurality of network interfaces.

20. The method according to claim 17, wherein the predefined hierarchy further comprises:
   clustering the data into a plurality of sub-groups on the basis of timestamp of the data; and
   cataloguing the data in each of the plurality of sub-groups to form a first set of catalogued data on the basis of at least one criterion from a set of criteria, wherein the set of criteria comprises data type, device type of each of the plurality of network computing devices, and user defined tag for the data.

21. The method according to claim 17, wherein the predefined hierarchy is modified by the at least one user.

22. The method according to claim 17, further comprises a step of performing multi-dimensional structured search on the first set of catalogued data, wherein dimensions of the multi-dimensional search are at least one of data type, device type of each of the plurality of network computing devices, timestamp and user defined tag for the data.

23. The method according to claim 17, further comprising transcoding at least one of the data to suit requirements of the recipient set of network computing devices, wherein the requirements of the recipient set of network computing devices comprise file type of the data, and size of the data.

24. The method according to claim 23, wherein the step of transcoding is preceded by at least one of predicting device type of each of the recipient set of network computing devices, and file types supported by each of the recipient set of network computing devices based on past behavior of the at least one user in the data network.

25. The method according to claim 17, further comprises mapping ZIP code of the recipient network computing device with a Cable/Internet Protocol (IP) TV service provider's name and up converting the video before transmission to the dynamic data management system of the intended recipient when the recipient network computing device is a cable/IP TV not within a local network of the at least one user.

26. A computer program product for dynamic management and distribution of data between a plurality of users in a data network, wherein the computer program product comprises at least one non-transitory computer-readable storage medium having computer-readable program code portions stored therein, the computer-readable program code portions comprising:
   a first executable portion
      for automatically capturing a plurality of content from a plurality of network computing devices of at least one user via a personal virtual system and storing the plurality of content into a memory allocated for the at least one user in the personal virtual system, wherein the personal virtual system is configured to interact with the plurality of network computing devices of the at least one user; and
      for automatically categorizing the captured plurality of content into a plurality of clusters based on analysis of timestamps;

wherein the timestamps refer to the time each item of the captured content is captured;

wherein the timestamps are used to determine if the content associated with the timestamps should be categorized into different clusters based on a gap of time between timestamps;

wherein a cluster represents a specific event, and after the timestamp analysis, the cluster is further catalogued on the basis of any combination of device type, content type or data type;

a second executable portion for automatically retrieving a plurality of information from external information management services via the personal virtual system, wherein the at least one user is a registered member of the external information management services; and a third executable portion for automatically transferring data comprising the plurality of content and the plurality of information to one or more of the plurality of network computing devices referred to as recipient devices of one or more other users subscribed to the personal virtual system based on contact list of the at least one user.

27. The computer program product of claim 26, wherein automatically capturing the plurality of content from the plurality of network computing devices comprises choosing a network interface from a plurality of network interfaces based on bandwidth of the network interface or on a user defined condition.

28. The computer program product of claim 26, wherein the transferring of the data comprises learning from the at least one user's past actions of sharing the plurality of content among the plurality of network computing devices.

29. The computer program product of claim 26, wherein the computer-readable program code portions further comprise:

a fourth executable portion for transforming the plurality of content, uploaded to the personal virtual system, to suit requirements of the recipient devices, wherein requirements of the recipient devices comprise compatibility of network computing device to each of the plurality of content, file type of each of the plurality of content, and size of each of the plurality of content, and storing the transformed plurality of content in the memory allocated to the at least one user on the dynamic data management and distribution system.

30. The computer program product of claim 26, wherein the computer-readable program code portions further comprise a fifth executable portion adapted for:

clustering the plurality of content into a plurality of sub-groups on the basis of timestamp of the plurality of content; and cataloguing the plurality of content in each of the plurality of sub-groups to form a first set of catalogued content on the basis of at least one criterion from a set of criteria, wherein the set of criteria comprises content type of each of the plurality of content, device type of each the plurality of network computing devices and user defined tag of each of the plurality of contents; and a sixth executable portion for performing a multi-dimensional structured search on the first set of catalogued content.

\* \* \* \* \*